UNITED STATES PATENT OFFICE.

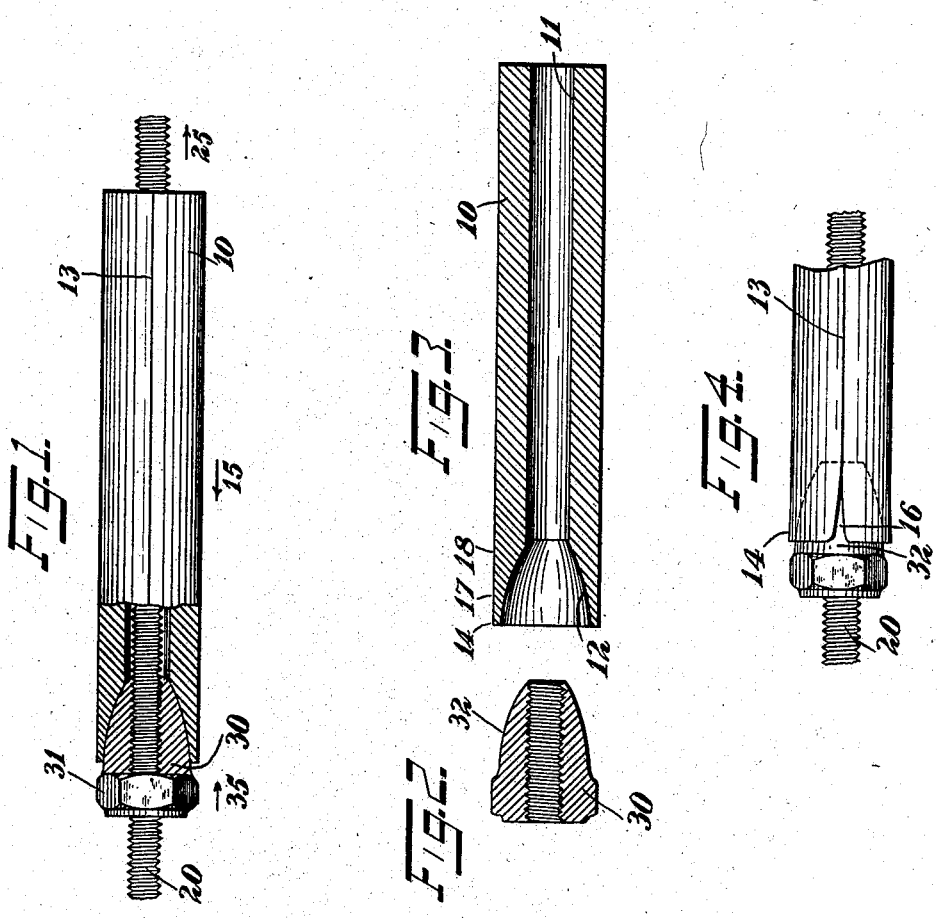

JULIUS ADERER, OF NEW YORK, N. Y.

NUT-LOCK.

No. 900,462.   Specification of Letters Patent.   Patented Oct. 6, 1908.

Application filed March 27, 1908. Serial No. 423,520.

*To all whom it may concern:*

Be it known that I, JULIUS ADERER, a citizen of the United States, residing in the borough of Manhattan, in the city of New York, county of New York, and State of New York, have invented certain new and useful Improvements in Nut-Locks, of which the following is a specification.

This invention relates to nut locks and has for its object to provide improved means for preventing the accidental displacement of a nut. In this construction the longitudinal strain placed upon a nut, by the stem or screw upon which it is applied, will be received by coöperative conoidal faces. These conoidal faces will not only receive the longitudinal strain but will also serve to resist rotation of the nut. In practice there will preferably be a conoidal bearing face upon the nut for entering a conoidal socket, the member bearing the socket will be split and its walls at the larger end of the socket sufficiently thin to be resilient, and sufficiently thick at the smaller end to be resistant, so that one portion of the face of the socket will act as an abutment for longitudinal strains and another portion of the same face will resist rotation.

In the drawings accompanying and forming a part of this specification Figure 1 illustrates partly a side elevation and partly a longitudinal section of a form of my invention. Fig. 2 is a longitudinal section of the bushing or nut portion. Fig. 3 is a longitudinal section of the shell or sleeve portion; and Fig. 4 is a detail in elevation of the nut and the end of the shell with the bushing or nut in position on the stem.

In the present illustration are shown three parts, namely a shell, 10, somewhat in the nature of a sleeve; a stem, 20, within the sleeve; and a bushing, 30, in the form of a nut which has screw threaded engagement with the stem. The stem 20 is shown as screw threaded and in engagement with the screw threaded bore of the bushing or nut 30, and such stem is shown extending through the longitudinal bore 11 of the shell or sleeve 10. The bushing or nut 30 is provided with suitable wrench engaging faces 31 and a conoidal bearing face 32 for engaging a mating conoidal bearing face 12; the bearing face 12 is in the nature of a socket or enlargement of the bore of the shell. It will be seen that the smaller end of the conoid 32 is of less diameter than is the diameter of the bore 11. The stem 20 is of smaller diameter than the bore 11 and has a free fit in the shell. The shell 10 is split longitudinally at the end having the socket 12, and said split 13 may extend throughout the entire sleeve if desired.

Assuming that the relative stresses between the stem and the shell will be in the direction of the arrows 25 and 15 respectively, and between the shell and the nut in the direction of the arrows 15 and 35 respectively, the face 32 will press into the bearing 12 and will have a tendency to flex the thinner resilient portion 14 of the shell and place friction upon the face 32 for preventing the accidental rotation of the nut. When the portions 14 of the shell are flexed or expanded the slot 13 will open slightly. This is illustrated at 16 in Fig. 4.

The tendency of the thinner portion 14 of the walls of the seat to expand gradually decreases as this wall increases in thickness toward its inner end. As was before stated, the seat is conoidal and the taper will be gradual from the region 14 to about the region 17 when the walls are more rapidly thickened, so that the yieldability of the walls at the inner end of the seat will likewise gradually decrease. At about the point 18 a firm abutment will be presented for practically preventing the further inward movement of the nut under normal load. In manufacturing the device it can readily be determined what thickness will be necessary for presenting sufficient friction for preventing the rotation of the nut and for arresting its inward movement under the ordinary strains which will be placed upon it. When the ordinary longitudinal strains are exceeded, the split 13 in the sleeve will permit a still further longitudinal movement of the nut. Upon the cessation of these unusual strains the parts will again assume their normal relative positions, the pressure of the faces of the seat 12 upon the face 32 of the nut tending to move the nut in a contrary direction to the arrow 35 in Fig. 1.

The engagement between the nut and the shell is that of wedge faces only, there are no abrupt faces presented. The conodial bearing face 32 seats in the conodial socket 12 and the engagement between these two faces receives the strain which is placed longitudinally upon the stem in the direction of the arrow 25 and also acts to resist the rotation of the nut relative to the stem and to the shell. Attention is called to the fact that the smaller end of the conoid 32 is of less diameter than the bore 11 in the form of structure illustrated. This is for the purpose of preventing the frustrated end of the conoid from forming a shoulder in the socket or seat 12, which it might do if it was sharp, and had a sufficiently tight fit within the socket to bite the face of the socket and form a shoulder, and doing this would to some extent defeat the purpose of having the longitudinal strain received upon a sloping face.

Having thus described my invention, I claim:

1. The combination of a shell provided with a bore extending into a conoidal seat, the shell being longitudinally split through the seat, a screw threaded stem entering the bore and of less diameter than said bore, and a conoidal nut member mounted upon the stem, the smaller end of the conoidal nut member being of less diameter than the diameter of the said bore and constructed and adapted to enter the same beyond said seat.

2. The combination with a screw threaded member, of a nut thereon having a conoidal bearing portion, the general line of the face of the larger end of said conoid being disposed at a slight angle to its axis and the general line of the face of the smaller end being disposed at a relatively greater angle, and a shell provided with a longitudinal bore extending into a conoidal seat, the outer and larger end of the seat being disposed on a general line at a slight angle to the axis of said seat and constructed and adapted for engaging the larger end of the conoid of the nut, the wall of the shell at such outer and larger end being resilient, the seat face at the inner and smaller end being disposed at a relatively greater angle to the said axis and being constructed and adapted for engaging the smaller end of the conoid on the nut, the said wall of the shell at the region of the smaller end of the seat being less resilient than the wall at the larger end of said seat.

JULIUS ADERER.

Witnesses:
 CHAS. LYON RUSSELL,
 FRED. J. DOLE.